United States Patent [19]

Perraudin

[11] Patent Number: 4,683,785
[45] Date of Patent: Aug. 4, 1987

[54] METHOD OF CUTTING A WORM SCREW AND A WORM SCREW OBTAINED BY THE SAID METHOD

[75] Inventor: Hubert A. Perraudin, Champigny sur Marne, France

[73] Assignee: Equipements Automobiles Marchal, Issy-les-Moulineaux, France

[21] Appl. No.: 695,068

[22] Filed: Jan. 25, 1985

Related U.S. Application Data

[63] Continuation of Ser. No. 243,805, Mar. 16, 1981, abandoned.

[30] Foreign Application Priority Data

Mar. 25, 1981 [FR] France ................................ 80 06581

[51] Int. Cl.⁴ ........................... B23B 1/00; B23G 1/00
[52] U.S. Cl. ........................................................ 82/1 C
[58] Field of Search ................. 82/5, 1 C, 14 R, 14 A, 82/14 B; 409/65, 66, 48, 12; 74/58, 59, 424.5, 458, 89.15

[56]  References Cited

U.S. PATENT DOCUMENTS

| 1,000,898 | 8/1911 | Cushing | 82/14 R |
| 2,469,262 | 5/1949 | Eggers | 82/5 |
| 2,593,310 | 4/1952 | Johnson | 82/14 A |
| 3,147,655 | 9/1964 | Honekamp | 82/5 |
| 3,237,492 | 3/1966 | Massey | 82/14 R |
| 3,731,546 | 5/1973 | MacDonald | 74/89.15 |
| 3,844,177 | 10/1974 | Bourassa | 74/89.15 |

FOREIGN PATENT DOCUMENTS

| 7636327 | 6/1978 | France | 82/5 R |
| 143995 | 9/1979 | Japan | 82/5 R |
| 648355 | 2/1979 | U.S.S.R. | 82/5 R |

OTHER PUBLICATIONS

*How to Run a Lathe* 42nd Edition 1942, J. J. & M. W. O'Brien, p. 80.
*Lathes* vol. II 1963 by P. S. Houghton, p. 2.
*Machine Shop Practice* vol. 1 Karl Moltrecht, Industrial Press Inc., N.Y., N.Y., pp. 275–281, 289–294.

*Primary Examiner*—Nicholas P. Godici
*Assistant Examiner*—Jerry Kearns
*Attorney, Agent, or Firm*—Brisebois & Kruger

[57]  ABSTRACT

A worm screw has two threaded portions of opposite hand cut on a single shaft, using a lathe. Several passes of the cutting tool are used to form each of these threaded portions, and in order to provide a compact and robust worm screw of this type the two threaded portions are separated by a groove having a depth shallower than that of the threads being cut and having a width at least equal to 15% of the greater axial pitch of the threaded portions.

11 Claims, 2 Drawing Figures

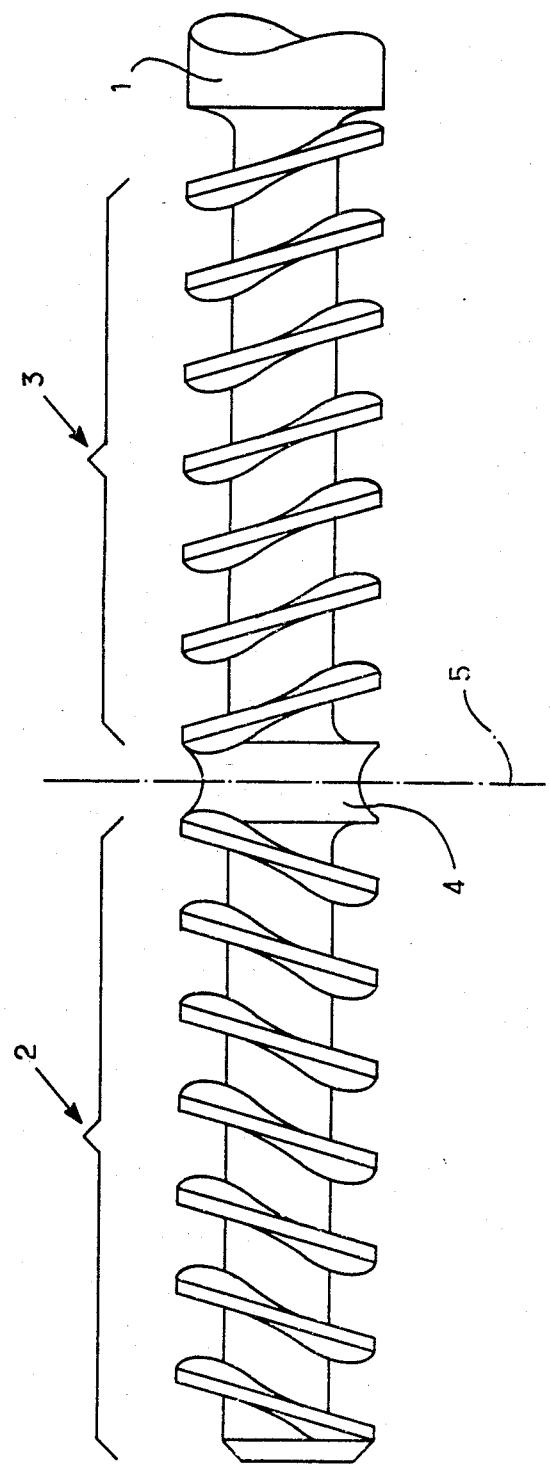

METHOD OF CUTTING A WORM SCREW AND A WORM SCREW OBTAINED BY THE SAID METHOD

This is a continuation, of application Ser. No. 243,805, filed Mar. 16, 1981 and now abandoned.

DESCRIPTION

BACKGROUND OF THE INVENTION

The present invention concerns a method for cutting worm screws comprising two adjacent threaded portions having respective threads which are of opposite hand. The invention also relates to a worm screw obtained by such a method.

In our French Patent Ser. No. 2,372,998 and in our Certificate of Addition Application No. 79-15796 thereto, there has already been proposed a gear transmission device comprising a driving shaft and driven shaft fixed in relation to each other, one of the shafts carrying two threads of opposite hand and being connected to the other shaft by two different kinematic gear drive trains, each comprising one of the two above-mentioned threads. Since this device has given every satisfaction as regards its transmission efficiency, it has now been attempted to manufacture economically such shafts carrying two adjacent worm screw threaded portions having their respective threads of opposite hand.

Amongst the various known cutting methods, it has been found to be worthwhile to effect the cutting on a lathe, and since the depth of thread necessary for the worm screw is considerable, provision has been made for the cutting to be effected during several successive passages of the cutting tool. For such a worm screw, the external diameter is fixed, on the one hand, by the depth of the thread necessary for a good meshing with the pinions associated with the worm screw and, on the other hand, by the diameter of the root circle (i.e. the residual part near the axis) of the screw, which diameter is determined by the magnitude of the torques to be transmitted. The length of the threaded portions to be cut on the original cylindrical shaft is governed by the need to have adequate meshing of the worm threads with the threads of pinions cooperating therewith, but since the transmission between the input shaft and the output shaft is effected by two different kinematic gear trains, one of these kinematic gear trains comprises an intermediate pinion of relatively large diameter, (the diameter of this intermediate pinion being all the greater when the interspacing is increased between the two threaded portions of opposite hands along the cylindrical shaft on which the threads are cut.). It is therefore clear that in order to reduce the dimensions of the transmission mechanism using such a worm screw, it is desirable to bring the two threaded portions of the same shaft as close to each other as is at all possible.

On the other hand, it is known that when cutting worm screw threads on a lathe, the worm screw is continuously turning and the cutting tool may effect several successive passes to cut the desired thread. In the case of cutting a deep thread, this cutting operation is effected with a considerable number of passes and, at the beginning of each pass, the tool must be brought radially inwardly towards the axis of the shaft to be cut. In this approaching motion of the cutting tool, it must be prevented from abutting the workpiece with one of its distinct cutting edges. To reduce the risk of contact by the tool, it is possible to increase the rake angle of the tool, but in practice in this field the margin for manoeuvre is extremely limited because the cutting angle of the tool is fixed by (a) the cutting speed, (b) the nature of the material cut and (c) the nature of the tool, and the angle of the cutting edge of the tool should be as large as possible to avoid any excessive fragility of the tool, e.g. embrittlement of the tool. In practice, the rake angle of the tool for cutting a worm screw of the desired type cannot therefore be greatly modified and is always near 6°. To avoid tool contact, the approach of the tool must be controlled, in terms of the rotation of the shaft being cut so that the cutting tool describes in relation to the shaft a trajectory in the shape of a twisted curve and making it possible to reach the zone to be cut without striking on the shaft material. The projection of this twisted curve on a plane perpendicular to the axis of the shaft being cut is a spiral arc and its projection on a plane passing through the axis of the shaft to be cut constitutes a curve segment whose ends define a chord forming an acute angle with the axis of the shaft to be cut. In other words, the motion of approach of the tool is obtained by displacing the tool in the axial direction of the shaft to be cut (and in the direction of the thread) at the same time as it is brought closer to the axis of the shaft to be cut. This motion of approach is all the more delicate the nearer the tool action is to the axis of the shaft to be cut, that is to say that the trajectory of the approach is defined for the last cutting pass but for convenience the approach trajectory of the tool is kept at this same form for all the earlier passes.

As has been indicated above, it is very desirable for a gear mechanism of the type specified in French Pat. No. 2,372,998—to obtain a maximum proximity for the adjacent ends of the two threaded portions of opposite hand. If, after the first such threaded portion has been cut, the cutting of the second portion is commenced by proceeding in such a way that the two adjacent ends of the two threaded portions are substantially in the same transverse plane of the cut shaft, there will be a difficulty by reason of the fact that in its motion of approach for each pass of the cutting of the second threaded portion, the cutting tool encounters the previously cut thread of the first threaded portion, and this entails shock loads on the cutting tool which rapidly lead to its deterioration. To avoid this drawback, one way of course interspace the two nearer ends of the two adjacent threaded portions of the worm screw, but then the size of the resulting gear mechanism using the worm screw rapidly increases as does the cost of the worm screw and that of the complete gear mechanism. Thus one is faced with a problem: if it is desired to reduce the cost by reducing the dimensions, the cutting tool will deteriorate and the production cost will increase whereas it is precisely in order to reduce the said cost that production by lathe has been chosen. If the increase in production costs is avoided by ensuring the long life of the cutting tool of the lathe, the size of the worm screw is increased and hence the material cost of the mechanism as a whole.

BRIEF SUMMARY OF THE INVENTION

The object of the present invention is to overcome the difficulty set out above. According to the present invention, the zones occupied by the two threaded portions of opposite hand are separated by a groove which is cut in the shaft before the cutting of the two threaded portions is begun. In this way, the approach trajectories of the cutting tool for the first threaded portion and for the second threaded portion are contained in the said groove, and the cutting tool will not then, during its approach for the cutting of the second threaded portion, strike the thread of the first cut threaded portion. Moreover, according to the approach trajectory which is adopted, the groove width may be relatively small thereby allowing the two said threaded portions to be brought close to each other to a much greater extent than if one were to be content to add end to end the dead zones necessary for the approach motions of the tool for cutting each one of the two sections. Finally the depth of the groove may be less than the depth of the thread: it is sufficient for the said groove to be just deep enough to contain the approach trajectories of the tool for the cutting of the two said threaded portions. This allows the strength of the shaft between the two cut threaded portions to be improved. It will thus be seen that the invention make it possible simultaneously to avoid an increase in production costs by promoting the long life of the cutting tool and to avoid an increase in material costs by helping to bring the two threaded portions on the same shaft into close proximity.

In particular, the present invention provides a method for cutting a worm screw from a cylindrical shaft on a lathe, the said worm screw comprising two adjacent threaded portions with their respective threads of opposite hands and being cut by successive passes of a cutting tool whose approach at the beginning of each pass is effected in the zone between the two threaded portions and is defined in the same way for all the passes, wherein in the zone of separation between the two said threaded portions a groove is cut before starting the cutting of the thread or threads of the said threaded portion, said groove having a depth at least equal to half of that of the thread and having a width which is at least 15% of the larger axial pitch of the two threaded portions.

The object of the present invention is also a worm screw obtained by this above defined method.

According to a preferred embodiment of the worm screw of the invention, the groove has a triangular cross section or an arcuate one; the said respective threads of the two threaded portions have the same pitch values and the groove is symmetrical in relation to the plane of symmetry of said two threaded portions; the two threaded portions are each constituted by a multi start thread, the number of threads being the same for the two said threaded portions; the width of the groove is less than twice the common axial pitch of the two threaded portions; for each of the two threaded portions, the axial pitch PA satisfies the relation: $\phi/8 \leq PA \leq 3\phi/8$, where $\phi$ is the external diameter of the cylindrical shaft before cutting; and the threads of the two threaded portions have a depth HF meeting the relation: $\phi/8 \leq HF \leq 3\phi/8$ where $\phi$ has the same significance as before.

DESCRIPTION OF THE DRAWING

To render the invention more readily understood there will now be described, by way of a purely illustrative and non-restrictive example, a mode of implementation represented in the accompanying drawing, in which:

FIG. 1 shows a worm screw formed by the method according to the invention;

FIG. 2 shows the approach motion of the tool.

DETAILED DESCRIPTION

Referring to the drawing, it will be seen that the worm screw formed by the method according to the invention has been cut in a cylindrical shaft 1 having, in the example described, a diameter of 8 mm. The worm screw comprises two threaded portions 2 and 3; threaded portion 2 has a left hand thread and threaded portion 3 has a right hand thread. Each of the two threaded portions 2 and 3 is constituted by a two-start thread, the pitch of each thread start being 5.2 mm; the axial pitch, that is to say, the distance measured along a generatrix between the centres of two successive helixes is therefore 2.6 mm. The two threaded portions 2 and 3 are separated from each other by a groove 4 whose cross-section has approximately the profile of a circular arc. The groove can have a triangular profile as shown in dotted lines at 4' of FIG. 1. The central plane 5 of groove 4 (represented in the drawing by a dot dash line) constitutes a plane of symmetry on the one hand for groove 4 and on the other hand for the two threaded portions 2 and 3 cut in the worm screw.

In the example described, the depth of groove 4 at plane 5 is 1.2 and its width, measured parallel to the shaft axis 1, is 4 mm. The depth of the threads cut in portions 2 and 3 is 1.8 mm.

The cutting of shaft 1 is effected on a multispindle lathe in the following manner: Firstly, the groove 4 is obtained. Then the threads of portion 2 are cut on several successive passes. Finally, the threads of portion 3 are cut in successive passes.

Shaft 1 is made of medium hard steel; the cutting tool is a carbide tool whose cutting angle is 6°, and the angle of rake is also 6°.

During operation, the shaft 1 is in permanent rotation. The approach trajectory 8 (FIG. 2) of the tool from the larger diameter, namely the outer diameter of the shaft 1, to the smaller diameter, namely that of the residual core, is effected along a left hand curve having a projection on a plane 10 perpendicular to the axis of shaft 1 in the shape of a spiral subtending an angle of 240° at the axis, and having a projection on a plane 12 passing through the axis in the form of an arc whose projection onto the axis has a length of 3.5 mm.

It has been found that by respecting the production conditions set out above, the cutting of the two threaded portions 2 and 3 was effected without the cutting tool abutting the threads of portion 2 in its approaching motion to start cutting the portion 3. It has thus duly been possible to obtain the sought after reduction in production costs because the production is effected economically on a multi-spindle lathe without excessively rapid deterioration of the cutting tools. Moreover, the narrow width of the groove 4 makes it possible to reduce the overall length of the region of shaft 1 embracing the two threaded portions 2 and 3, and therefore to reduce the size of the eventual reduction gear mechanism using shaft 1.

It shall be duly understood that the embodiment described above is in no way restrictive and may give rise to any desirable modification without thereby departing from the scope of the invention as defined in the appended claims.

We claim:

1. A method of cutting, from a cylindrical shaft, a worm screw having two adjacent threaded portions with respective worm threads of opposite hand, said method comprising the steps of, (a) mounting the shaft in a lathe, (b) rotating the shaft with the lathe, (c) initially forming a groove in the shaft between the two adjacent threaded portions of the worm threads to be cut, said groove forming a zone of separation, (d) cutting a worm thread in the shaft of one hand, to one side of said groove, by successive similar passes of a cutting tool whose approaching motion at the beginning of each pass is effected in the grooved zone of separation between the two threaded portions, (e) cutting a second worm thread in the shaft of opposite hand, to the other side of said groove by successive similar passes of a cutting tool whose approaching motion at the beginning of each pass is effected in the grooved zone of separation between the two threaded portions, wherein the worm threads cut in steps (d) and (e) are each of a predetermined depth and pitch, and wherein said step (c) of intially forming the groove comprises forming a groove of a depth less than the depth of the threads but at least one half of the and two times the pitch of the threads formed in steps (d) and (e).

2. The method of claim 1, wherein said groove formed in step (c) has a cross-sectional profile which is an arcuate profile.

3. The method of claim 2 wherein the respective worm threads of opposite hand formed in steps (d) and (e) have the same pitch and depth, the worm threads are symmetrical about a transverse plane of the shaft; and the groove formed in step (c) is symmetrical in relation to said plane of symmetry.

4. A method according to claim 2, wherein the two worm threads formed in steps (d) and (e) each comprise a multi-start thread, the number of said thread starts being the same for said two worm threads.

5. A method according to claim 4 wherein for each of said two worm threads $\phi/8 \leq PA \leq 3\phi/8$ where $\phi$ is the external diameter of the cylindrical shaft before cutting the worm threads therein, and PA is the axial pitch of a worm thread cut in step (d) or (e).

6. A method according to claim 4 wherein for each of said two worm threads $\phi/8 \leq HF \leq 3\phi/8$ where $\phi$ is the external diameter of the cylindrical shaft before cutting the respective worm threads therein, and HF is the depth of a worm thread.

7. A method according to claim 1 wherein for each of said two worm threads $\phi/8 \leq PA \leq 3\phi/8$ where $\phi$ is the external diameter of the cylindrical shaft before cutting the worm threads therein, and PA is the axial pitch of a worm thread cut in step (d) or (e).

8. A method according to claim 1 wherein for each of said two worm threads $\phi/8 \leq HF \leq 3\phi/8$ where $\phi$ is the external diameter of the cylindrical shaft before cutting the respective worm threads therein, and HF is the depth of a worm thread.

9. The method of claim 1 wherein said groove formed in step (c) has a cross-sectional profile which is a triangular profile.

10. The method of claim 9 wherein the respective worm threads of opposite hand formed in steps (d) and (e) have the same pitch and depth, the worm threads are symmetrical about a transverse plane of the shaft; and the groove formed in step (c) is symmetrical in relation to said plane of symmetry.

11. A method according to claim 10 wherein the two worm threads formed in steps (d) and (e) each comprise a multi-start thread, the number of said thread starts being the same for said two worm threads.

* * * * *